(12) United States Patent
Shimamoto et al.

(10) Patent No.: US 11,535,396 B2
(45) Date of Patent: Dec. 27, 2022

(54) FLYING OBJECT CONTROL SYSTEM AND FLYING OBJECT CONTROL METHOD

(71) Applicant: Panasonic Intellectual Property Management Co., Ltd., Osaka (JP)

(72) Inventors: Takeshi Shimamoto, Hyogo (JP); Seiji Kubo, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 408 days.

(21) Appl. No.: 16/907,830

(22) Filed: Jun. 22, 2020

(65) Prior Publication Data

US 2020/0407078 A1     Dec. 31, 2020

(30) Foreign Application Priority Data

Jun. 28, 2019   (JP) .............................. JP2019-121906

(51) Int. Cl.
*B64F 1/22*     (2006.01)
*B64F 1/12*     (2006.01)
*B64C 39/02*    (2006.01)

(52) U.S. Cl.
CPC ............ *B64F 1/222* (2013.01); *B64C 39/024* (2013.01); *B64F 1/125* (2013.01); *B64C 2201/027* (2013.01); *B64C 2201/088* (2013.01); *B64C 2201/146* (2013.01); *B64C 2201/201* (2013.01)

(58) Field of Classification Search
CPC ...... B64F 1/125; B64F 1/222; B64C 2201/20; B64C 2201/201
See application file for complete search history.

(56) References Cited

U.S. PATENT DOCUMENTS

2015/0194685 A1     7/2015   Ballantine et al.

FOREIGN PATENT DOCUMENTS

| | | |
|---|---|---|
| JP | 2017-503174 | 1/2017 |
| WO | 2015/103529 | 7/2015 |
| WO | 2018/011879 | 1/2018 |

*Primary Examiner* — Nicholas McFall
(74) *Attorney, Agent, or Firm* — Wenderoth, Lind & Ponack, L.L.P.

(57) ABSTRACT

A flying object control system includes a flying object, and a setting base that performs holding of the flying object and releasing the holding, the flying object and the setting base being communicable with each other. The flying object controls, upon receiving a takeoff instruction, thrust for taking off from a predetermined initial position, and when the thrust becomes greater than or equal to a first threshold, the flying object notifies the setting base of a start notification. Upon receiving the start notification, the setting base releases the holding of the flying object and notifies the flying object of a release completion notification. Upon receiving the release completion notification, the flying object takes off from the predetermined initial position by controlling the thrust in such a manner that the thrust becomes a second threshold smaller than the first threshold.

11 Claims, 9 Drawing Sheets

FIG. 4
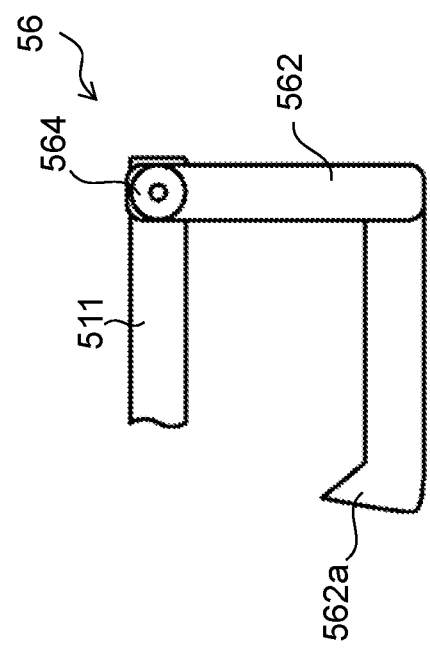
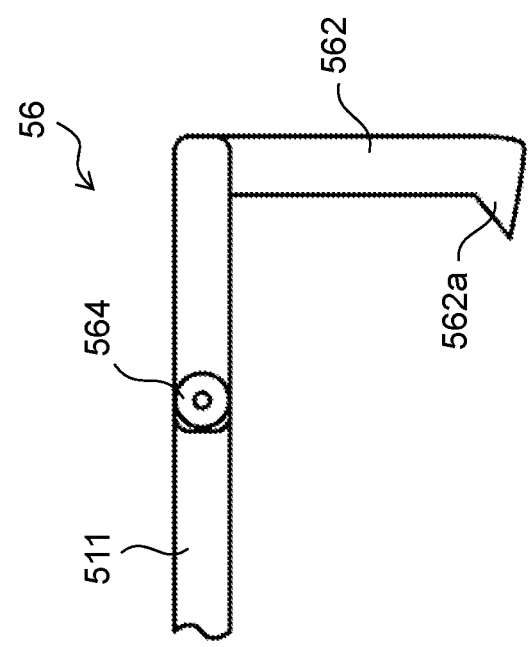

FLYING OBJECT CONTROL SYSTEM AND FLYING OBJECT CONTROL METHOD

BACKGROUND

1. Technical Field

The present disclosure relates to a flying object control system and a flying object control method.

2. Description of the Related Art

Patent literature (PTL) 1 discloses a technique in which electric power is supplied to an unmanned flying object by contactless power supply, and, at the same time, performances and functions of the unmanned flying object are affected to a limited degree. Specifically, an unmanned flying object includes: a base on which a flight control device is provided; a plurality of arms that extend a predetermined length in a circumferential direction from the base and on each of which a thrust generating device is provided; a battery that supplies electric power to the flight control device or thrust generating devices; and leg supports that extend downward and secure, under the base, a space in which a load is loaded. At a position, on the unmanned flying object, higher than the base, there is provided a power reception coil that receives, by contactless power supply, electric power to be supplied to the battery.

PTL 1 is International Publication No. 2018/011879.

SUMMARY

An object of the present disclosure is to provide a flying object control system and a flying object control method in which it is possible to perform a smooth takeoff operation of a flying object from a predetermined initial position and to thus improve convenience of an inspection work using the flying object to grasp conditions of an inspection object.

The present disclosure provides a flying object control system that includes: a flying object; and a setting base that performs holding of the flying object and releasing the holding, where the flying object and the setting base are communicable with each other. The flying object controls, upon receiving a takeoff instruction, thrust for taking off from a predetermined initial position, and when the thrust becomes greater than or equal to a first threshold, the flying object notifies the setting base of a start notification. Upon receiving the start notification, the setting base releases the holding of the flying object and notifies the flying object of a release completion notification. Upon receiving the release completion notification, the flying object takes off from the predetermined initial position by controlling the thrust in such a manner that the thrust becomes a second threshold smaller than the first threshold.

The present disclosure provides a flying object control method performed by a flying object control system including, in a mutually communicable manner, a flying object and a setting base that performs holding of the flying object and releasing the holding. The flying object control method includes: upon receiving a takeoff instruction, the flying object controlling thrust for taking off from a predetermined initial position; when the thrust becomes greater than or equal to a first threshold, the flying object notifying the setting base of a start notification; upon receiving the start notification, the setting base releasing the holding of the flying object and notifying the flying object of a release completion notification; and upon receiving the release completion notification, the flying object taking off from the predetermined initial position by controlling the thrust in such a manner that the thrust becomes a second threshold smaller than the first threshold.

With the present disclosure, it is possible to perform a smooth takeoff operation of a flying object from a predetermined initial position and thus to improve convenience of an inspection work using the flying object to grasp conditions of an inspection object.

BRIEF DESCRIPTION OF THE DRAWINGS

FIG. 4 is a diagram showing an example of an opening and closing operation of arms;

DETAILED DESCRIPTION (Circumstances Leading Up to an Exemplary Embodiment of the Present Disclosure)

In PTL 1, an unmanned flying object is hanging via a hook provided on a charging station side to receive electric power from a power transmission coil of a charging station by contactless power supply at the time of charging. Therefore, the technique of PTL 1 does not concern that the unmanned flying object performs at least a takeoff operation of the two operations: a takeoff operation from, for example, a charging station (in other words, a flight operation for departing from a charging station); and a landing operation (in other words, a flight operation for returning back to a charging station). For example, when an inspector wants to perform aerial imaging or to know conditions of an inspection object by using the unmanned flying object, a hanging structure cannot be released from the charging station in the technique of PTL 1; therefore, the convenience of the inspector cannot be improved.

With reference to the drawings as appropriate, a detailed description will be given below on an exemplary embodiment that specifically discloses a flying object control system and a flying object control method according to the present disclosure. However, an unnecessarily detailed description will be omitted in some cases. For example, a detailed description of a well-known matter and a duplicated description of substantially the same configuration will be omitted in some cases. This is to avoid the following description from being unnecessarily redundant and thus to help those skilled in the art to easily understand the description. Note that the attached drawings and the following description are provided for those skilled in the art to sufficiently understand the present disclosure, and are not intended to limit the subject matter described in the appended claims.

Figure 1:
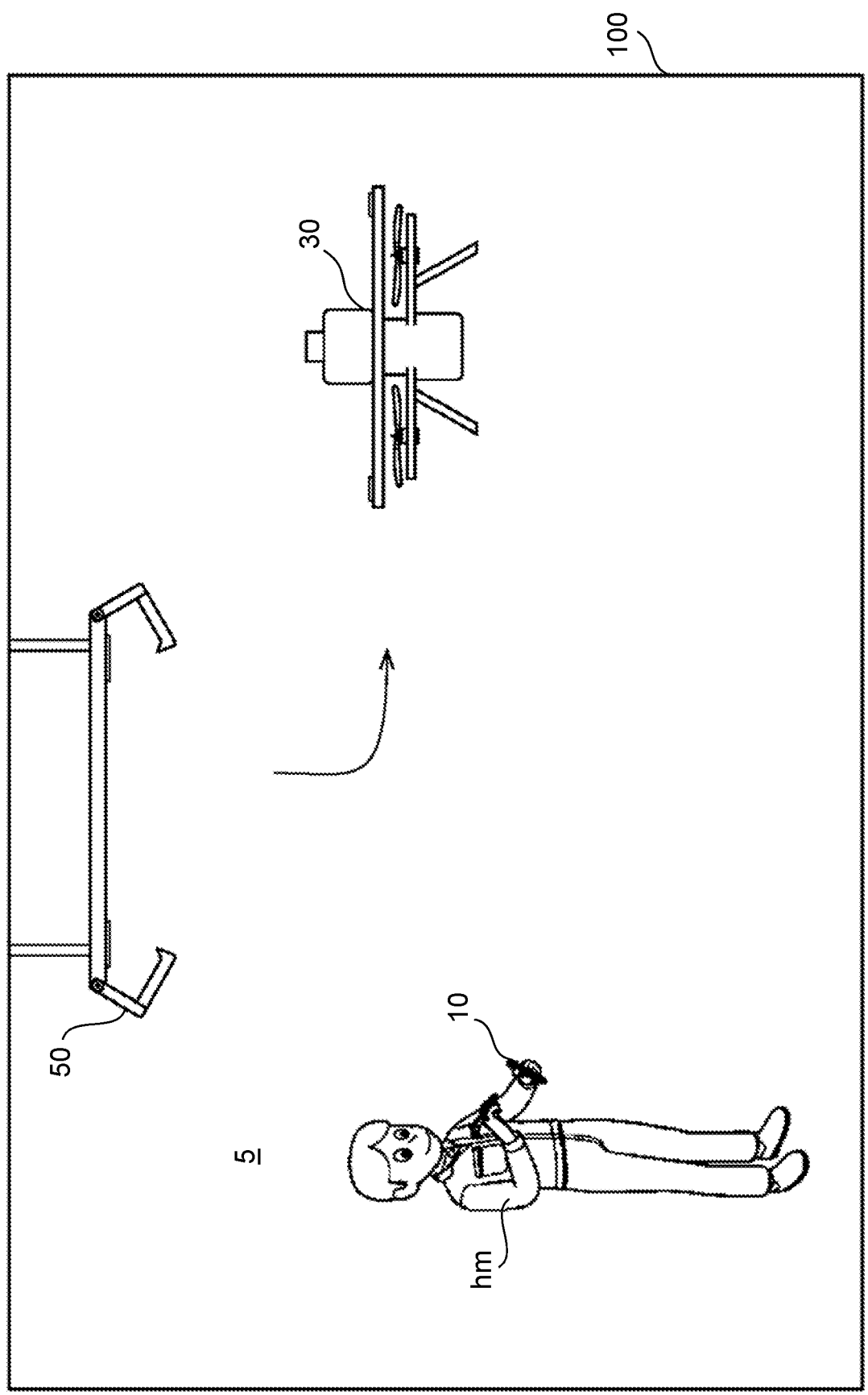
FIG. 1 is a diagram schematically showing a flying object control system according to a first exemplary embodiment.

FIG. 1 is a diagram schematically showing flying object control system 5 according to a first exemplary embodiment; Flying object control system 5 is a system for inspecting, as an example, closed space 100 such as an interior of a room or an object in closed space 100 (inspection object), and is disposed in closed space 100. In closed space 100, inspector hm carries terminal 10. Further, setting base 50 is attached on a ceiling of closed space 100. Flying object 30 can stay on setting base 50. With reference to FIG. 1, inspector hm operates terminal 10 to instruct flying object 30 to take off from an attachment position of setting base 50. Flying object 30 takes off from setting base 50, following the instruction from terminal 10, and autonomously flies in closed space 100 (in other words, flying object 30 can fly autonomously without following the instruction from terminal 10). Note that flying object control system 5 not only flies in the above-mentioned closed space 100 but also may inspect spaces other than a closed space. For example, in flying object control system 5, setting base 50 may be disposed on the lower surface side of a bridge, and flying object 30 may take off from the lower surface side and may land on the lower surface side. Note that, under the bridge, there may be an uneven surface or a ground on which an inclined surface is formed.

Figure 2:
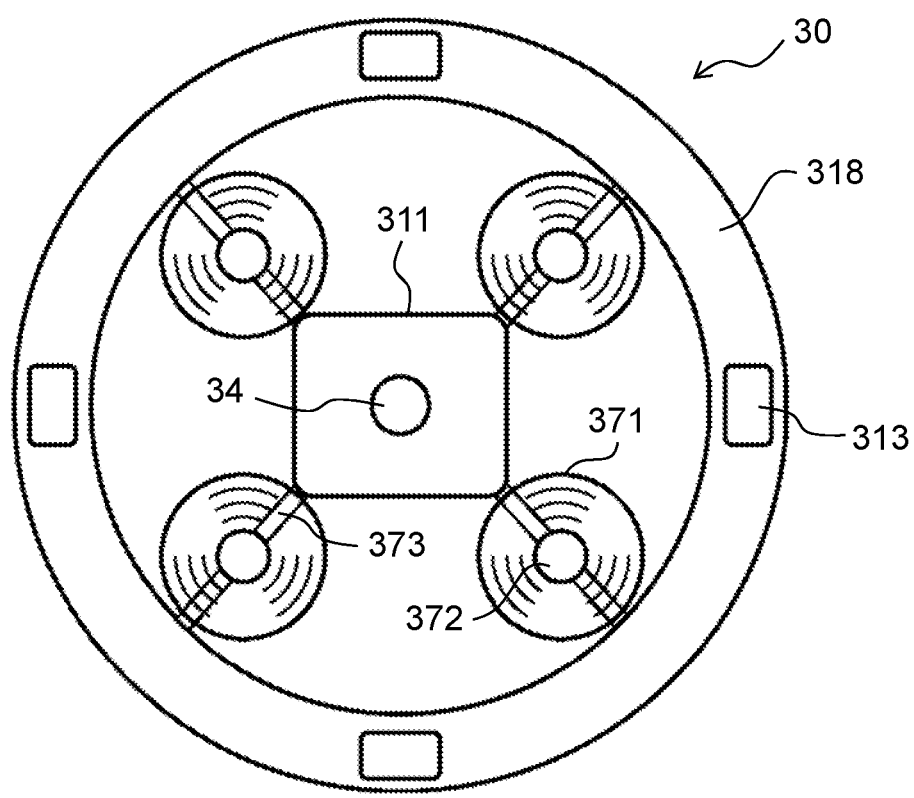
FIG. 2 is a plan view showing an example of an outer shape of the flying object.

FIG. 2 is a plan view showing an example of an outer shape of flying object 30. Flying object 30 includes: control box 311 containing a control board capable of controlling operations of flying object 30; four rotor blades 371 (in other words, propellers) each pivotally supported on one of four motors 372; ring-shaped bumper 318 that absorbs vibration and impact; and upper camera 34 capable of capturing an image above flying object 30. Each of four motors 372 is attached on one of four support members 373 extending from a body of control box 311. Flying object 30 drives each of four motors 372 and performs control by rotation of rotor blades 371 while estimating thrust for flight on the basis of rotation speeds and other information. Note that in the present specification, the flight includes three-dimensional movement and means a concept comprehensively including not only ascent but also descent and hovering (keeping suspended in the air). On an upper surface of ring-shaped bumper 318, there are attached magnetic bodies 313 substantially equidistantly or equidistantly in four directions. Magnetic bodies 313 can be attracted by electromagnetic holders 55 (see FIG. 3) attached on setting base 50. Magnetic bodies 313 are ferromagnetic material (in particular soft magnetic material), which are magnetized by external magnetic force.

Figure 3:
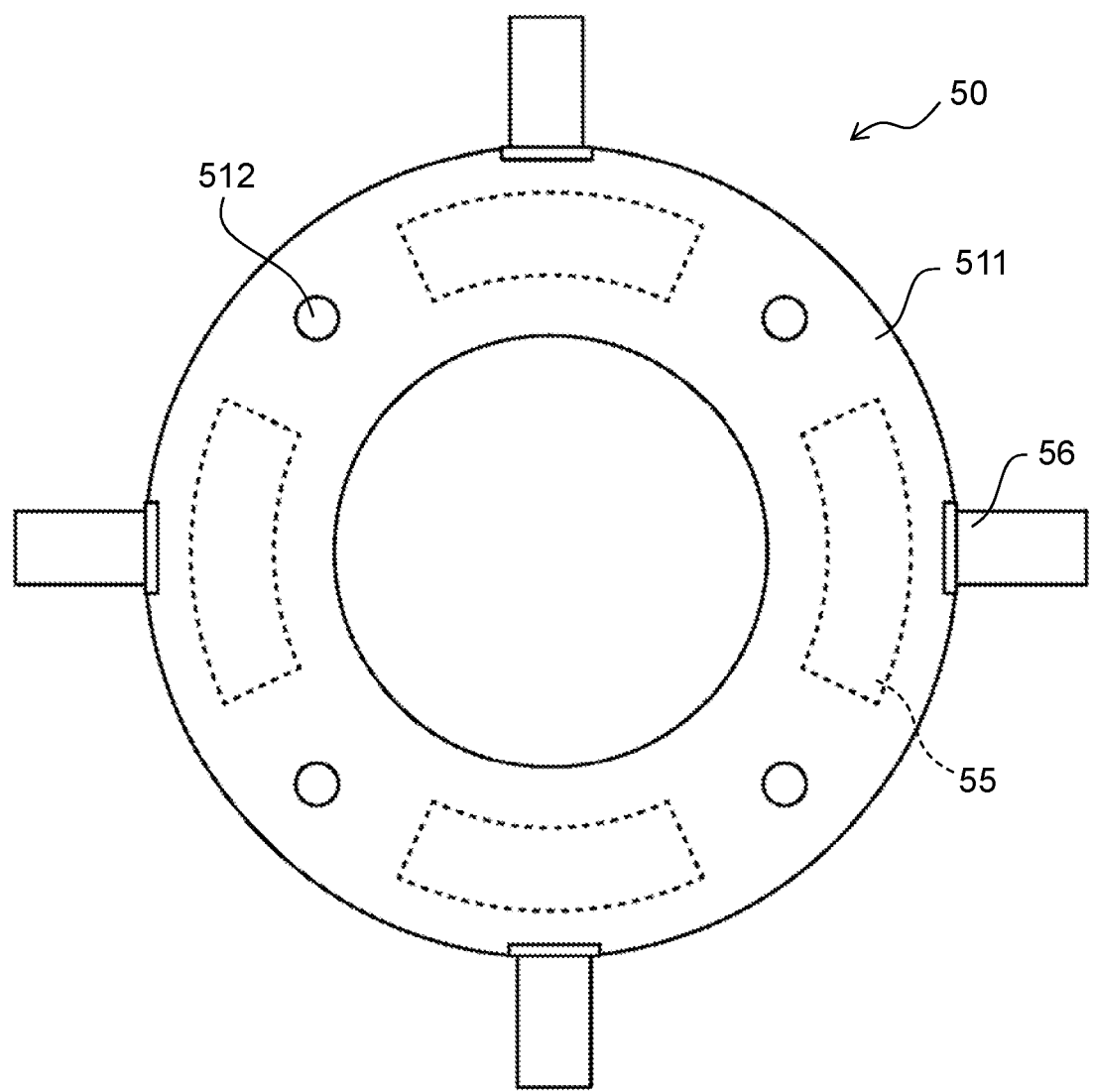
FIG. 3 is a plan view showing an example of an outer shape of a setting base.

FIG. 3 is a plan view showing an example of an outer shape of setting base 50. Setting base 50 has: circular ring-shaped plate 511; four arms 56 each attached in one of four directions on a peripheral edge part of plate 511; four rods 512 that supports plate 511 from a ceiling of closed space 100; and electromagnetic holders 55 each attached in one of four directions on a peripheral surface of plate 511. The plan view of FIG. 3 is a plan view as viewed in the direction in which the ceiling is viewed right above from a position in FIG. 1 at which inspector hm is. Each electromagnetic holder 55 may be either of the following two types, for example: an electromagnetic holder using an electromagnet (first electromagnetic holder); and a permanent electromagnetic holder using a permanent magnet and an electromagnet (second electromagnetic holder). In the case where electromagnetic holders 55 are the above-mentioned first electromagnetic holders, magnetic force is generated when electromagnetic holders 55 are energized, and magnetic force is not generated when electromagnetic holders 55 are not energized. Further, in the case where electromagnetic holders 55 are the second electromagnetic holders, magnetic force is not generated when electromagnetic holders 55 are energized, and magnetic force is generated when electromagnetic holders 55 are not energized. Further, inside plate 511, there is provided a control board (not shown) that can control operations of setting base 50.

FIG. 4 is a diagram showing an example of an opening and closing operation of arm 56; Arm 56 has: motor 564 attached on a peripheral edge part of plate 511: and grip member 562 that is pivotally supported by a rotary shaft of motor 564 and is rotatable around the rotary shaft to each of a horizontal position and a vertical position. Grip member 562 has a shape having a bend in substantially an L-shape or in an L-shape. On a tip of grip member 562, there is formed claw 562a.

Arms 56 open grip members 562 outward (in other words, toward the side where flying object 30 is released) when flying object 30 takes off from setting base 50. Further, arms 56 close grip members 562 inward (in other words, toward the side where flying object 30 are enclosed) when flying object 30 has landed on setting base 50. At this time, claws 562a come in contact with a lower surface of bumper 318 of flying object 30 fixed on setting base 50 to constrain flying object 30.

Figure 5:
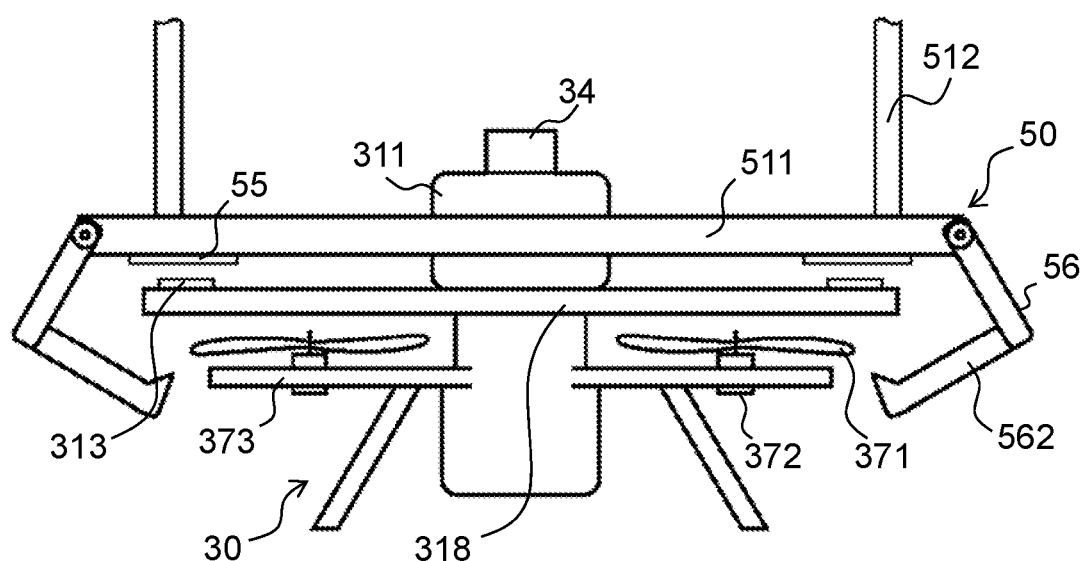
FIG. 5 is a diagram showing a flying object taking off from the setting base.

FIG. 5 is a diagram showing flying object 30 taking off from setting base 50. When flying object 30 is fixed on setting base 50, control box 311 of flying object 30 sticks out toward the ceiling through an opening of circular ring-shaped plate 511 of setting base 50. Magnetic bodies 313 attached on the upper surface of bumper 318 of flying object 30 are attracted by electromagnetic holders 55 attached on the lower surface of plate 511 of setting base 50. Grip members 562 of arms 56 are closed, and part of each grip members 562 is directly under bumper 318 of flying object 30. Claws 562a formed on the tips of grip members 562 are in contact with the lower surface of bumper 318 of flying object 30, so that arms 56 support flying object 30 from below.

On the other hand, when flying object 30 is taking off from setting base 50, grip members 562 of arms 56 move outside from under bumper 318 of flying object 30 and become opened. At this time, claws 562a get apart from the lower surface of bumper 318 to release flying object 30.

Figure 6:
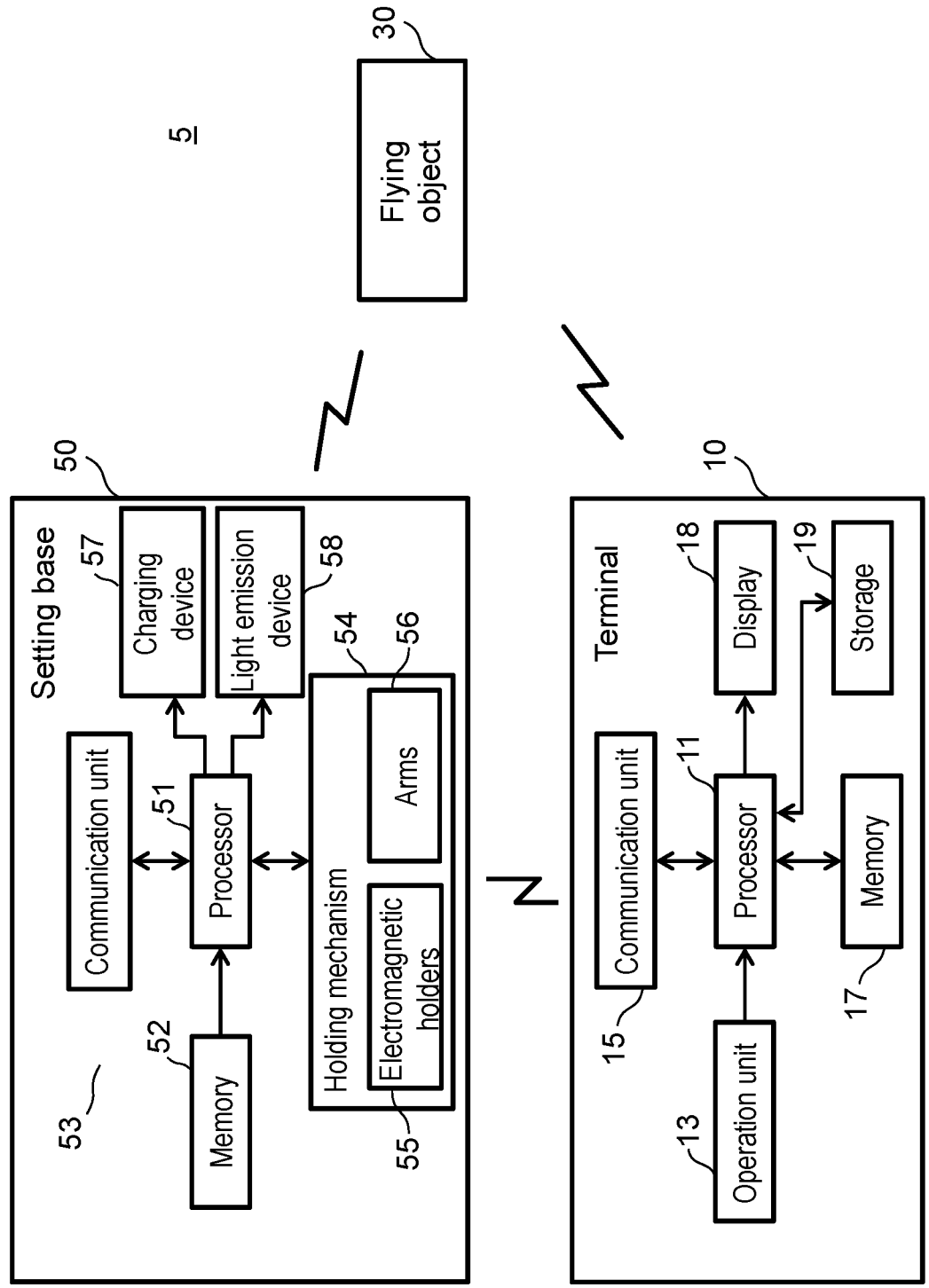
FIG. 6 is a block diagram showing an example of a system configuration of the flying object control system.

FIG. 6 is a block diagram showing an example of a system configuration of flying object control system 5. Flying object control system 5 is configured to include terminal 10, flying object 30, and setting base 50. Terminal 10 is carried by inspector hm and receives operations of inspector hm including a takeoff instruction to flying object 30. Terminal 10 includes processor 11, operation unit 13, communication unit 15, memory 17, display 18, and storage 19.

By executing a program stored in memory 17, processor 11 realizes various functions including input and output processing, arithmetic processing, and storage processing. Processor 11 is configured with a micro processing unit (MPU), a central processing unit (CPU), and a digital signal processor (DSP), and a graphical processing unit (GPU), for example, Alternatively, processor 11 may be configured with a dedicated electronic circuit designed by an application specific integrated circuit (ASIC) or other devices or may be configured with a reconfigurable electronic circuit designed by a field programmable gate array (FPGA) or other devices.

Processor 11 obtains data from flying object 30 via communication unit 15. Processor 11 obtains data having been input via operation unit 13. Processor 11 obtains data held in memory 17. Processor 11 can transmit, to flying object 30 via communication unit 15, a takeoff instruction to take off from setting base 50 and various types of data (for example, information of position, speed, and flight route). Processor 11 displays on display 18 display information of completion of takeoff, landing notification, and other information.

Operation unit 13 receives operations of the inspector of terminal 10. Operation unit 13 includes input devices such as a button, a key, a mouse, a keyboard, a touch pad, a touch panel, and a microphone. Operation unit 13 can receive a touch operation, a tap operation, a drag operation, and other operations that use the input device.

In accordance with various wireless communication methods, communication unit 15 performs wireless communication with each of flying object 30 and setting base 50. Examples of the communication methods include wireless local area network (wireless LAN), and short-range wireless communication. Further, when communication unit 15 is connected to each of flying object 30 and setting base 50 with a communication line, wired communication may be performed.

Memory 17 stores various types of data, information, programs, and the like. Memory 17 includes a random access memory (RAM) used as a working memory of processor 11 and a read only memory (ROM).

Display 18 is configured with a liquid crystal display device, an organic electroluminescence (organic EL) device, or other display devices. Display 18 displays various types of data having been output from processor 11.

Storage 19 accumulates and holds various types of data. Storage 19 is configured with a hard disk drive (HDD), a solid state drive (SSD), a secure digital card (SD card), a universal serial bus (USB) memory, or other devices. Storage 19 may be detachably provided on terminal 10.

Setting base 50 is a station where flying object 30 stays. Setting base 50 has processor 51, memory 52, communication unit 53, holding mechanism 54, charging device 57, and light emission device 58.

Processor 51 is configured with an MPU, a CPU, a DSP, a GPU, or other devices. Alternatively, processor 51 may be configured with a dedicated electronic circuit designed by an ASIC or other devices or may be configured with a reconfigurable electronic circuit designed by an FPGA or other devices.

Memory 52 stores various types of data, information, programs, and the like. Memory 52 includes a RAM used as a working memory of processor 51 and a ROM.

In accordance with various wireless communication methods, communication unit 53 performs wireless communication with each of terminal 10 and flying object 30. Examples of the communication methods include wireless LAN and short-range wireless communication. Further, when communication unit 15 is connected to each of terminal 10 and flying object 30 with a communication line, wired communication may be used. Communication unit 53 relays the communication performed between flying object 30 and terminal 10. When a closed space is shielded from radio waves and setting base 50 is attached as a part of the closed space, even if inspector hm carrying terminal 10 is outside the closed space, flying object 30 flying in the closed space and terminal 10 can communicate with each other via setting base 50.

Holding mechanism 54 has electromagnetic holders 55 (an example a first holder) and arms 56 (an example of a second holder) to fix flying object 30 staying on setting base 50. Note that holding mechanism 54 may have only one of arms 56 and above-mentioned electromagnetic holders 55.

When each electromagnetic holder 55 is, for example, the above-mentioned second electromagnetic holder, each electromagnetic holder 55 is configured to include a permanent magnet and an electromagnet. Electromagnetic holders 55 generate magnetic force of permanent magnets when the electromagnets are not energized, and can attract a magnetic material that is a part of flying object 30. On the other hand, when the electromagnets are energized, the magnetic force of the permanent magnets is cancelled, and electromagnetic holders 55 release the attracted magnetic material. As the permanent magnet, a neodymium magnet or a samarium-cobalt magnet is used, for example. Note that, as components other than the above-mentioned first electromagnetic holder and second electromagnetic holder, each electromagnetic holder 55 may include a rod that can extend and retract depending on energization and may include a permanent magnet. When electromagnetic holders 55 are energized, electromagnetic holders 55 release the magnetic bodies in such a manner that the rods push the magnetic bodies that are attracted by the permanent magnets when electromagnetic holders 55 are not energized. By using such a type of electromagnetic holders, the magnets attract the magnetic bodies when the electromagnetic holders are not energized, and the magnets releases the magnetic bodies when the electromagnetic holders are energized, so that the electromagnetic holders only have to be energized when releasing, and electric power can be saved.

Note that at least one electromagnetic holder 55 is provided. In the first exemplary embodiment, four electromagnetic holders 55 are provided on circular ring-shaped plate 511, for example. When flying object 30 is staying, each of four electromagnetic holders 55 is opposed to one of four magnetic bodies 313 disposed on bumper 318 of flying object 30. In the case where a plurality of electromagnetic holders 55 (four, in this case) are provided, even if flying object 30 is displaced when flying object 30 lands on setting base 50, there is a higher possibility that any of four electromagnetic holders 55 can attract flying object 30. In particular, when four electromagnetic holders 55 are arranged to be shifted with respect to each of facing four magnetic bodies 313 in the circumferential direction, failure in attraction due to displacement occurs less frequently.

When electromagnetic holders 55 are attracting magnetic bodies 313 of flying object 30, arms 56 mechanically constrain flying object 30 in such a manner that arms 56 grip or store flying object 30. In the first exemplary embodiment, each arm 56 has motor 564 and L-shaped grip member 562 pivotally supported by a rotary shaft of motor 564. Note that the grip member may be a hand that has a plurality of finger members and a motor to drive a joint between each finger member so that the grip member is openable. In this case, the hands house flying object 30 in a space formed inside the plurality of finger members when the finger members are closed. Further, the hand may have electromagnets on side parts of the fingers, and the magnetic bodies may be energized to attract magnetic bodies attached on the side surface of flying object 30 so that flying object 30 can be securely fixed.

Charging device 57 charges power supply 42 (see FIG. 7) of flying object 30 fixed by holding mechanism 54. Charging may be performed by either a contact power supply method or a non-contact (in other words, wireless) power supply method. As the wireless power supply method, it is possible to use any of electromagnetic coupling type, a magnetic field resonance type, or an electromagnetic induction type.

Light emission device 58 has a light source that can project light in a direction of a lower hemisphere of setting base 50, and the light works as a mark when flying object 30 returns back to setting base 50. As the light source, it is possible to use a laser light source, a light emission diode (LED), an EL element, a fluorescent light, an incandescent lamp, a halogen lamp, a xenon lamp, or other devices. Flying object 30 may detects proximity to setting base 50 on the basis of information of light emitted by light emission device 58 (such as brightness or an area of the light included in a captured image). Alternatively, the position of light emission device 58 may be previously registered on flying object 30, and flying object 30 may calculate a flight route, a flight speed, a flight time, and the like on the basis of the difference between the position of light emission device 58 and the position of flying object 30.

Note that setting base 50 may include a microphone and may collect sounds such as a propeller sound generated by flying object 30 and other sounds to analyze conditions of flying object 30, and setting base 50 may notify terminal 10 of a result of the analysis. The sounds collected by the microphone includes, other than a propeller sound, sound generated at the time of taking off and landing, sound generated when a trouble occurs, and other sounds. With this arrangement, the inspector can grasp the conditions of flying object 30 on the basis of the analysis result of the sounds that terminal 10 is notified of.

Flying object 30 is an unmanned aircraft (so-called drone) capable of autonomous flight and inspects closed space 100 and an object in closed space 100. In the case of autonomous flight, the flying object stores data such as a flight route including a takeoff position and a landing position, and a flight time. That is, when flying object 30 is at a position where flying object 30 can perform wireless communication with terminal 10, flying object 30 can fly on the basis of a flight instruction from terminal 10 by inspector hm. On the other hand, when flying object 30 is at a position where flying object 30 cannot perform wireless communication with terminal 10, flying object 30 can fly on the basis of autonomous flight instead of a flight instruction from terminal 10 by inspector hm. In the latter case, flying object 30 can perform wireless communication with setting base 50.

Figure 7:
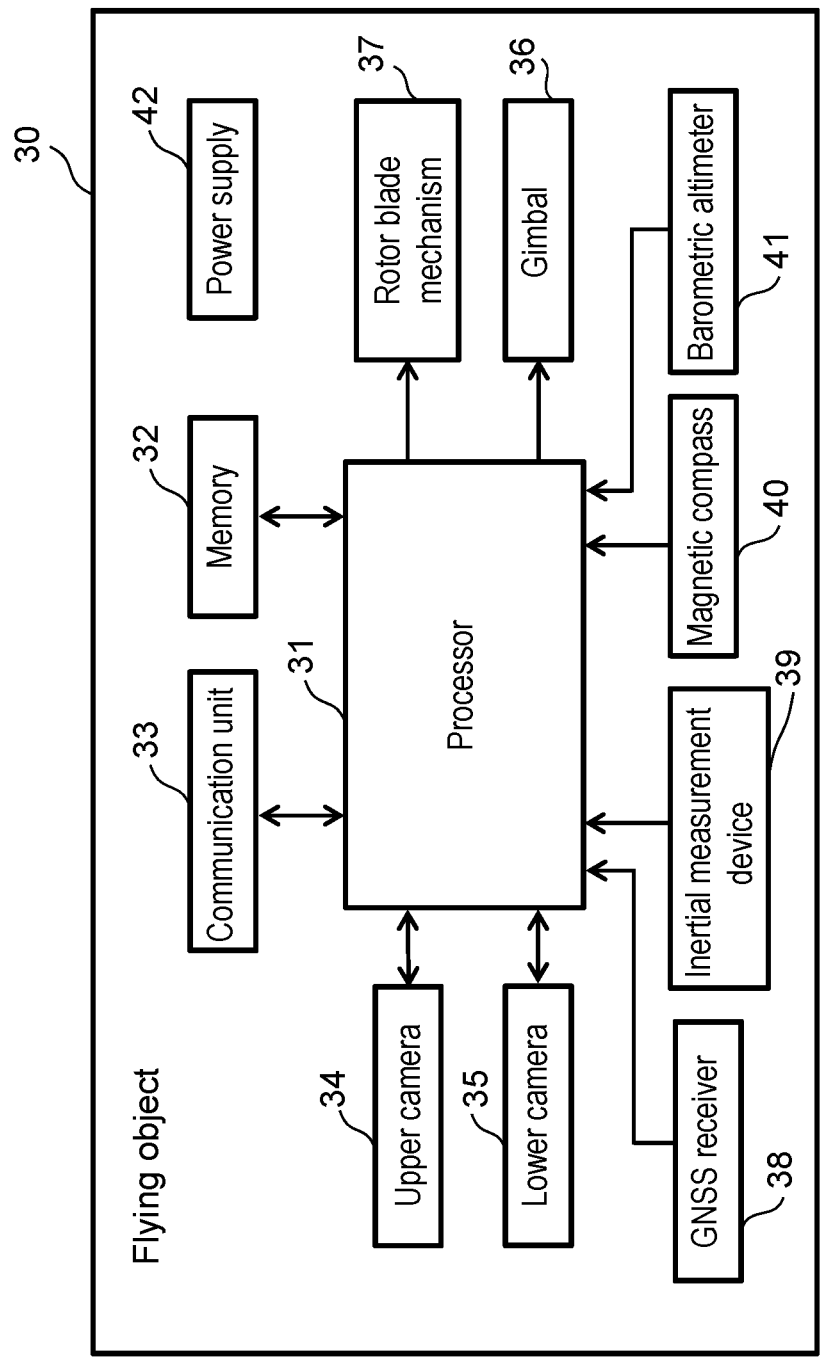
FIG. 7 is a block diagram showing a configuration of the flying object.

FIG. 7 is a block diagram showing a system configuration of flying object 30. Flying object 30 is configured to include processor 31, communication unit 33, memory 32, gimbal 36, rotor blade mechanism 37, upper camera 34, lower camera 35, GNSS receiver 38, inertial measurement device (IMU) 39, magnetic compass 40, and barometric altimeter 41.

Processor 31 is configured with, for example CPU, an MPU or a DSP. Processor 31 performs signal processing for integrally controlling an operation of each part of flying object 30, input and output processing of data with the other parts, arithmetic processing of data, and storage processing of data.

Processor 31 controls autonomous flight of flying object 30 according to a program stored in memory 32. At the time of autonomous flight, processor 31 refers to the data such as a flight route and a flight time stored in memory 32. Note that processor 31 may control the flight of flying object 30 according to the instruction received from a transmitter at a distant location via communication unit 33.

Processor 31 detects proximity to setting base 50 by analyzing a plurality of images captured by upper camera 34. Processor 31 specifies an environment around flying object 30 by analyzing a plurality of images captured by lower camera 35. Processor 31 controls flight on the basis of the environment around flying object 30 such that flying object 30 flies while avoiding an obstacle, for example. Note that flying object 30 may include a distance sensor (not shown) capable of emitting, for example, infrared light, and may detect proximity to setting base 50 on the basis of a detection result of the distance sensor.

Processor 31 obtains from date and time information indicating current date and time from, for example, GNSS receiver 38. Processor 31 obtains positional information indicating a current position of flying object 30 from, for example, GNSS receiver 38. Processor 31 obtains direction information indicating an azimuth direction of flying object 30 from magnetic compass 40. The direction information indicates, for example, the azimuth direction corresponding to the direction of a nose of flying object 30.

Processor 31 obtains from, for example, memory 32 the positional information indicating the position where flying object 30 should be when upper camera 34 captures an image of an imaging area to be imaged. Processor 31 obtains from, for example, memory 32 imaging information indicating the imaging area of lower camera 35. Processor 31 obtains data of images captured by upper camera 34 and lower camera 35.

Processor 31 controls each of gimbal 36, rotor blade mechanism 37, upper camera 34, and lower camera 35. Processor 31 controls the imaging area of upper camera 34 by changing an imaging direction or an angle of view of upper camera 34. Processor 31 controls the imaging area of upper camera 34 supported by gimbal 36 by controlling a rotation mechanism of gimbal 36.

Processor 31 controls the flight of flying object 30 by controlling rotor blade mechanism 37. In the flight control, a position including a latitude, a longitude, and a height of flying object 30 are changed. When upper camera 34 includes a zoom lens, processor 31 may control the angle of view of upper camera 34 by driving the zoom lens. Further, processor 31 may control the angle of view of upper camera 34 by using a digital zoom function of upper camera 34.

Memory 32 stores a program and other information that processor 31 needs to control each of gimbal 36, rotor blade mechanism 37, upper camera 34, lower camera 35, GNSS receiver 38, inertial measurement device 39, magnetic compass 40, and barometric altimeter 41. Memory 32 may be a computer-readable recording medium. Memory 32 may be provided inside flying object 30 or may be provided to be detachable from flying object 30.

Communication unit 33 performs wireless communication with each of terminal 10 and setting base 50. Examples of the communication methods include wireless LAN and short-range wireless communication.

Gimbal 36 supports upper camera 34 to be rotatable about at least one axis. Further, gimbal 36 may support upper camera 34 to be rotatable around a yaw axis, a pitch axis, and a roll axis. When gimbal 36 rotates upper camera 34 around at least one of the yaw axis, the pitch axis, and the roll axis, upper camera 34 can change the imaging direction.

Rotor blade mechanism 37 has: a plurality (four, in this exemplary embodiment) of rotor blades 371; and a plurality (four, in this exemplary embodiment) of motors 372 each of which rotates one of the plurality of rotor blades.

Upper camera 34 captures an image of an object in a desired imaging area and generates data of the captured image. The image data obtained by image capturing by upper camera 34 is stored in a memory of upper camera 34 or in memory 32.

Lower camera 35 captures an image of environs of flying object 30 and generates data of the captured image. The image data of lower camera 35 is stored in memory 32.

GNSS receiver 38 receives a plurality of signals which are transmitted from GNSS satellites serving as a plurality of navigation satellites and each of which indicates time and the position (for example, coordinate) of each GNSS satellite. On the basis of the received plurality of signals, GNSS receiver 38 calculates the position of GNSS receiver 38 (that is, the position of flying object 30). GNSS receiver 38 outputs the positional information of flying object 30 to processor 31.

Inertial measurement device 39 detects an attitude of flying object 30 and outputs a detection result to processor 31. Inertial measurement device 39 detects, as an attitude of flying object 30, accelerations of flying object 30 in the three axial directions: backward and forward, side to side, and up and down, and detects angular velocity of flying object 30 in the three axial directions: the pitch axis, the roll axis, and the yaw axis.

Magnetic compass 40 detects the azimuth of the nose of flying object 30 and outputs the detection result to processor 31. Barometric altimeter detects an altitude of flying object 30 when flying object 30 is flying, and outputs the detection result to processor 31.

Power supply 42 supplies electric power to each part of flying object 30. Power supply 42 may be either a primary battery or a secondary battery. Examples of the secondary battery include a lithium ion rechargeable battery, a nickel-metal-hydride battery, and a nickel-cadmium battery. When the secondary battery is used, power supply 42 can be charged when flying object 30 is staying on setting base 50 or in other occasions. Charging may be performed by either a contact power supply method or a non-contact (wireless) power supply method.

Next, a description will be given on an operation of flying object control system 5 according to the first exemplary embodiment.

Figure 8:
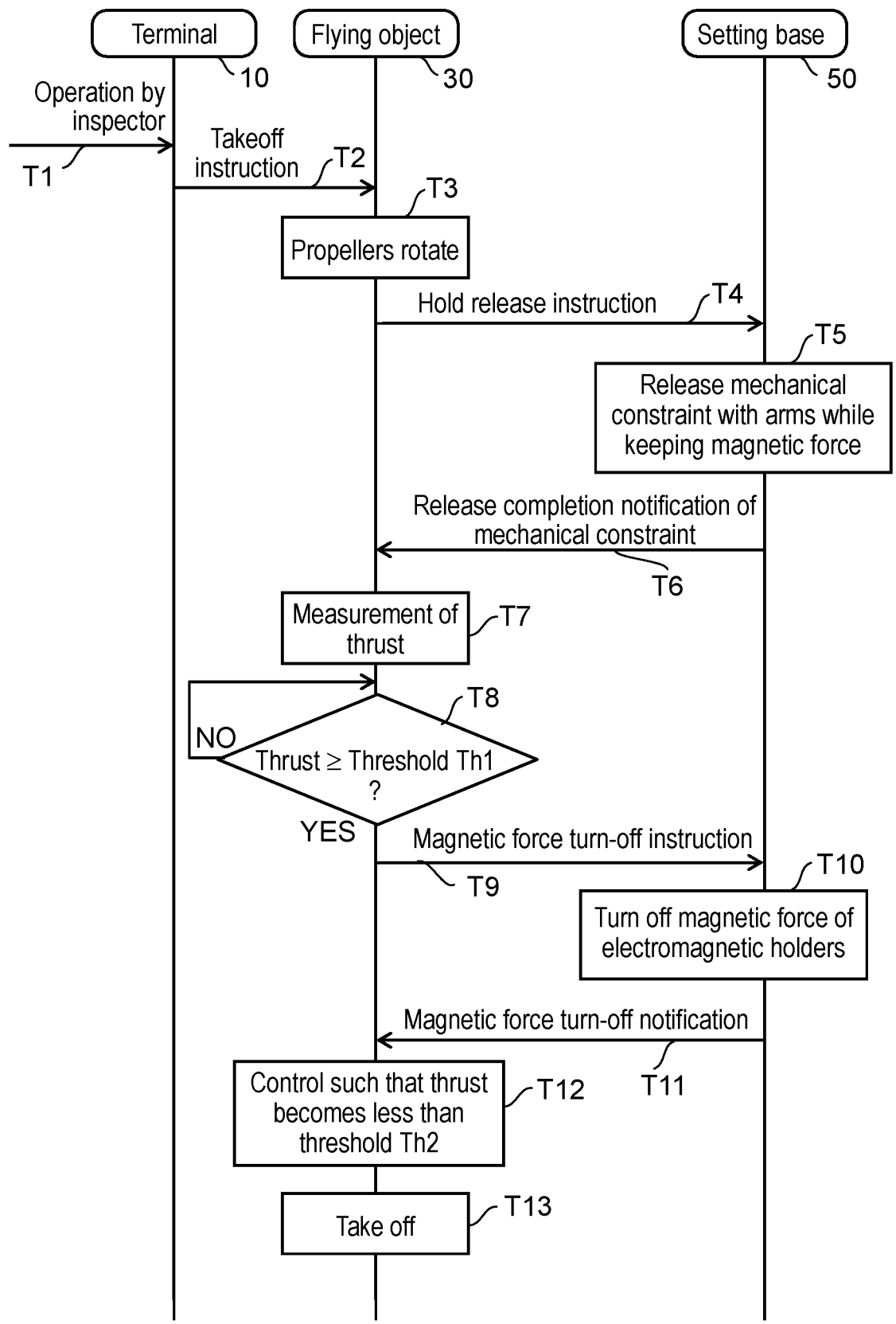
FIG. 8 is a diagram showing an example of a takeoff control sequence by the flying object control system according to the first exemplary embodiment.

FIG. 8 is a diagram showing an example of a takeoff control sequence by flying object control system 5 according to the first exemplary embodiment. Suppose a state where flying object 30 is docked at (connected to) and staying on setting base 50.

With reference to FIG. 8, inspector hm operates operation unit 13 of terminal 10 to instruct to take off (step T1). Upon reception of the operation of the instruction to take off, terminal 10 transmits a takeoff instruction to flying object 30 via communication unit 15 (step T2). However, terminal 10 may transmit the takeoff instruction to setting base 50, and setting base 50 may forward the takeoff instruction to flying object 30. Alternatively, terminal 10 may transmit the takeoff instruction to both setting base 50 and flying object 30.

When processor 31 of flying object 30 receives the takeoff instruction via communication unit 33, processor 31 drives rotor blade mechanism 37 (step T3). When rotor blade mechanism 37 is driven, flying object 30 starts to rotate rotor blades 371 and gradually increases the rotation speed while flying object 30 is being docked at setting base 50. Processor 31 transmits a hold release instruction to setting base 50 via communication unit 33 (step T4).

When processor 51 of the setting base receives the hold release instruction via communication unit 53, processor 51 drives holding mechanism 54 to release the mechanical constraint with arms 56 while keeping the magnetic force of electromagnetic holders 55 (step T5).

When the mechanical constraint by holding mechanism 54 has released, processor 51 notifies flying object 30 of a release completion notification of mechanical constraint via communication unit 53 (step T6). Note that processor 51 may transmits the release completion notification of mechanical constraint to terminal 10.

Processor 31 of flying object 30 causes, via communication unit 33, inertial measurement device 39 to start measurement of thrust (step T7). The measurement of the thrust by inertial measurement device 39 is continued until the takeoff is completed.

Processor 31 waits for the thrust measured by inertial measurement device 39 to become greater than or equal to a threshold Th1 while increasing the rotation speed of rotor blades 371 rotated by rotor blade mechanism 37 (step T8). Threshold Th1 is a value of the thrust when flying object 30 is hovering. If the thrust is less than the threshold Th1, processor 31 repeats the process of step T8. If the thrust becomes greater than or equal to the threshold Th1, processor 31 transmits an instruction to turn off the magnetic force (an example of a start notification) to setting base 50 (step T9).

When receiving the instruction to turn off the magnetic force via communication unit 53, processor 51 of setting base 50 energizes electromagnetic holders 55 (for example, the second electromagnetic holder) to turn off the magnetic force of electromagnetic holders 55, thereby releasing the electromagnetic constraint by electromagnetic holders 55 (step T10). Note that, in a case where electromagnetic holders 55 are configured with the first electromagnetic holder, when receiving the instruction to turn off the magnetic force, processor 51 of setting base 50 stops energization of electromagnetic holders 55 to turn off the magnetic force of electromagnetic holders 55, thereby releasing the electromagnetic constraint by electromagnetic holders 55 (step T10). Further, processor 51 notifies flying object 30, via communication unit 53, of a release completion notification of magnetic force by electromagnetic holders 55 (magnetic force turn-off notification) (step T11). Note that processor 51 may notifies terminal 10, via communication unit 53, of the release completion notification of magnetic force.

When receiving the release completion notification of magnetic force by electromagnetic holders 55 via communication unit 33, processor 31 of flying object 30 controls driving of rotor blade mechanism 37 such that the thrust of flying object 30 becomes less than a threshold Th2 (step T12). The threshold Th2 is a value of the thrust with which flying object 30 slowly descends, and the threshold Th2 has a smaller value than the threshold Th1 in the state of hovering.

When the thrust of flying object 30 becomes less than the threshold Th2, flying object 30 descends from setting base 50 and takes off (step T13). The takeoff of flying object 30 is determined on the basis of acceleration of flying object 30 in the vertical direction measured by inertial measurement device 39. Alternatively, the takeoff of flying object 30 may be determined on the basis of the image captured by upper camera 34, or when flying object 30 has a sensor to detect contact or proximity to setting base 50, the takeoff may be determined on the basis of a signal of the sensor. Further, processor 31 of flying object 30 may notify terminal 10 of the takeoff of flying object 30 via communication unit 33. Terminal 10 displays on display 18 the fact that flying object 30 has taken off. From this display, inspector hm can see that flying object 30 has taken off.

Figure 9:
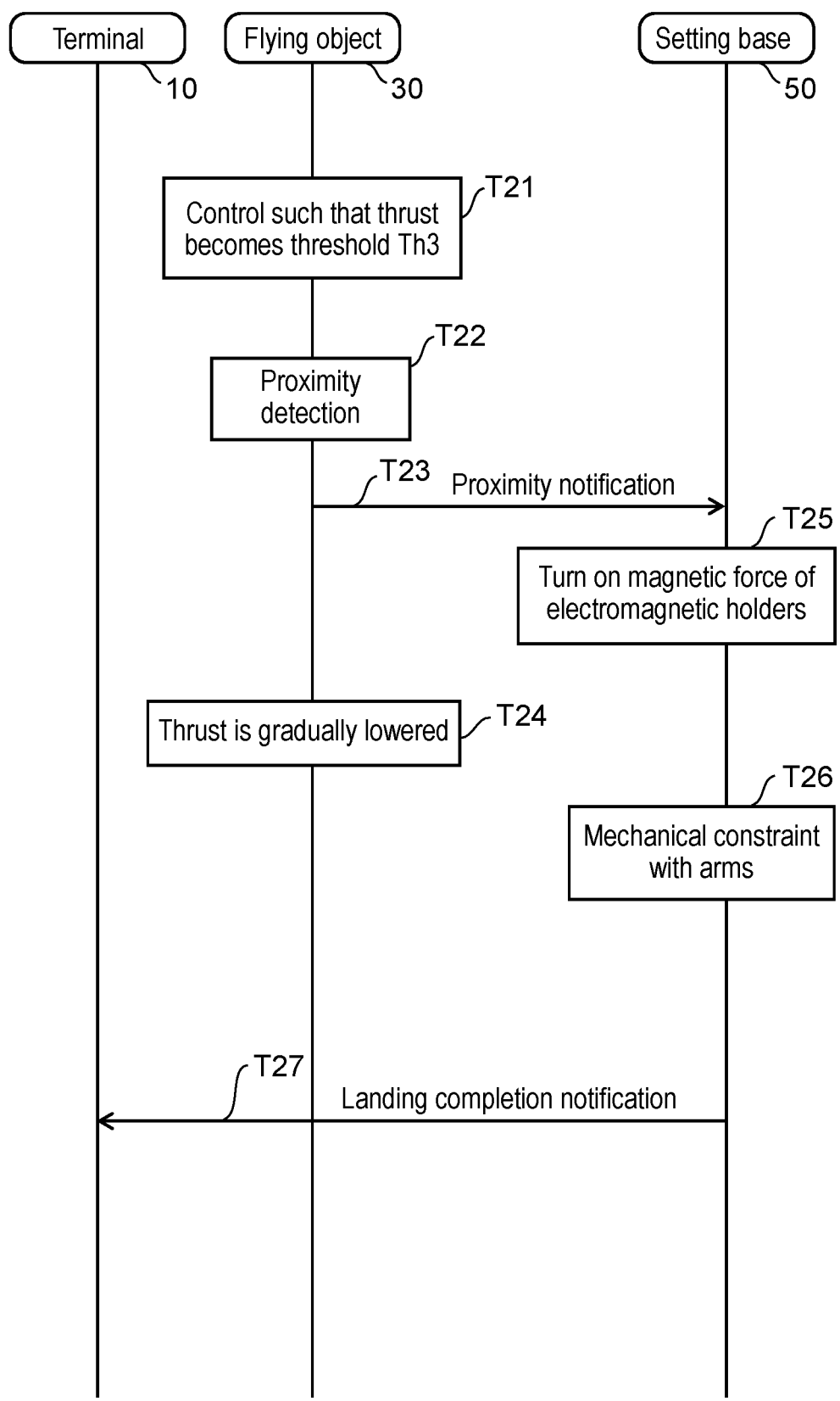
FIG. 9 is a diagram showing an example of a landing control sequence by the flying object control system according to the first exemplary embodiment.

FIG. 9 is a diagram showing an example of a landing control sequence by flying object control system 5 according to the first exemplary embodiment. Suppose that flying object 30 has reached just under setting base 50 and is flying or hovering.

With reference to FIG. 9, processor 31 of flying object 30 controls driving of rotor blade mechanism 37 such that the thrust of flying object 30 becomes a threshold Th3 (step T21). The threshold Th3 is the value of the thrust with which flying object 30 ascends up to setting base 50, and the threshold Th3 has a value greater than threshold Th1.

Processor 31 starts to capture an image by upper camera 34. Processor 31 analyzes the image captured by upper camera 34 to detect that flying object 30 is in proximity to setting base 50 (step T22). Note that the proximity of flying object 30 may be detected on the basis of the acceleration of flying object 30 in the vertical direction measured by inertial measurement device 39, or when flying object 30 has a sensor to detect contact or proximity to setting base 50, the proximity of flying object 30 may be determined on the basis of a signal of the sensor.

Processor 31 notifies, via communication unit 33, setting base 50 of a proximity notification informing of the proximity of flying object 30 (step T23). Note that processor 31 may notify both setting base 50 and terminal 10 of the proximity notification of flying object 30. Flying object 30 detects proximity to setting base 50 and issues the proximity notification in this embodiment; however, setting base 50 may detects the proximity of flying object 30 and may notify the flying object 30 of the proximity notification. When receiving the proximity notification from setting base 50, flying object 30 may perform the operations of step T24 and the succeeding steps.

Processor 51 of setting base 50 confirms that electromagnetic holders 55 are not energized and that grip members 562 of arms 56 are opened. Note that grip members 562 of arms 56 may be constantly opened when the flying object is flying or may be controlled such that grip members 562 are made open immediately before the setting base receives the proximity notification of the flying object. When receiving the proximity notification of flying object 30 via communication unit 53 (see step T23), processor 51 of setting base 50 turns on the magnetic force of electromagnetic holders 55 (in other words, puts electromagnetic holders 55 in a state where electromagnetic holders 55 generate magnetic force) (step T25). This operation enables a body of flying object 30 to be attracted by electromagnetic holders 55 of setting base 50, so that flying object 30 is docked at (connected to) setting base 50.

After flying object 30 is docked at (connected to) setting base 50 in step T25, processor 31 of flying object 30 controls the driving of rotor blade mechanism 37 such that the thrust is gradually lowered (step T24). Processor 31 stops the driving of rotor blade mechanism 37 to make the thrust zero.

Processor 51 drives grip members 562 of arms 56 to be closed (step T26). Grip members 562 house flying object 30 in a space formed inside grip members 562 and mechanically constrain flying object 30.

Processor 31 may stop the driving of rotor blade mechanism 37 immediately after flying object 30 is attracted by the magnetic force of electromagnetic holders 55 and is docked at setting base 50.

Processor 51 notifies, via communication unit 53, terminal 10 of a landing completion notification telling that flying object 30 is docked at setting base 50 (step T27). Note that processor 51 may notify, via communication unit 53, flying object 30 of the landing completion notification, and processor 31 of flying object 30 may forwards the landing completion notification to terminal 10. Alternatively, processor 51 may notify both flying object 30 and terminal 10 of the landing completion notification. When receiving the landing completion notification, terminal 10 displays on display 18 the fact that flying object 30 has landed. The inspector can confirm, by watching terminal 10, that flying object 30 has landed.

As described above, in flying object control system 5, when flying object 30 takes off from setting base 50 attached on the ceiling of the closed space, setting base 50 releases the mechanical constraint of flying object 30 by arms 56 beforehand. After flying object 30 rotates rotor blades 371 and generates thrust of threshold Th1 or more, setting base 50 releases the attraction of flying object 30 by magnetic force generated by electromagnetic holders 55. By this operation, it is possible to prevent flying object 30 from being released before thrust of threshold Th1 or more is generated. Therefore, flying object 30 can take off from setting base 50 smoothly and safely. Further, at the time of landing of flying object 30 on setting base 50, setting base 50 constrains flying object 30 by the magnetic force of electromagnetic holders 55 upon receiving the proximity notification from flying object 30. Flying object 30 gradually slows down the rotation of rotor blades 371. Setting base 50 mechanically constrains flying object 30 by gripping or storing flying object 30 with grip members 562 of arms 56. Therefore, flying object 30 can land on setting base 50 smoothly and safely.

As described above, flying object control system 5 according to the first exemplary embodiment includes, in a mutually communicable manner, flying object 30 and setting base 50 that can hold flying object 30 and can release the holding. Upon receiving the takeoff instruction, flying object 30 controls the thrust for taking off from the attachment position (an example of an initial position) of setting base 50 on the ceiling of the closed space. When the thrust becomes greater than or equal to the threshold Th1 (an example of a first threshold), for example, when a predetermined time has elapsed since the start of driving, flying object 30 notifies setting base 50 of a start notification (for example, a notification to instruct start of takeoff of flying object 30). Upon receiving the start notification, setting base 50 releases the holding of flying object 30 and notifies flying object 30 of a release completion notification of the holding. Upon receiving the release completion notification, flying object 30 controls the thrust such that the thrust becomes the threshold Th2 (an example of a second threshold), which is smaller than the threshold Th1, whereby flying object 30 takes off from setting base 50.

By this operation, the flying object control system can smoothly perform at least a takeoff operation of the flying object from the attachment position of the setting base; therefore, it is possible to improve convenience of the inspection work that uses the flying object and is performed by an inspector to grasp the conditions of an inspection object, for example, a closed space.

Further, flying object 30 performs control such that the thrust becomes the threshold Th3 (an example of a third threshold) greater than the threshold Th2, whereby flying object 30 gets close to setting base 50. Flying object 30 notifies setting base 50 of a proximity notification. Upon receiving the proximity notification, setting base 50 holds flying object 30. Setting base 50 notifies flying object 30 of a landing completion notification of flying object 30. By this operation, the flying object control system can smoothly perform a landing operation of the flying object on the setting base.

Further, upon receiving the takeoff instruction, flying object 30 notifies setting base 50 of a hold release instruction. Setting base 50 includes: electromagnetic holders 55 (an example of a first holder that can electromagnetically hold a flying object) that attract flying object 30 by magnetic force; and arms 56 (an example of a second holder that can mechanically constrain the flying object) that fix (lock) flying object 30 by gripping or storing. Upon receiving the hold release instruction, the setting base 50 maintains the attraction of flying object 30 by electromagnetic holders 55 and releases the locking of flying object 30 by arms 56. By this operation, the flying object control system can reliably hold the flying object by using both of attraction by the magnetic force of the electromagnetic holders and the locking by the arms. The flying object can easily stay on the setting base. Further, by releasing the locking by the arms before releasing the attraction by the magnetic force of the electromagnetic holders; the flying object control system can cause the flying object to smoothly and safely take off from setting base 50.

Further, when the thrust of flying object 30 becomes greater than or equal to the first threshold, setting base 50 releases the attraction of flying object 30 by electromagnetic holders 55 upon receiving the start notification transmitted from flying object 30. By this operation, the flying object control system can cause the flying object to take off after confirming that the flying object becomes capable of hovering state (in other words, capable of flying); therefore, safe flight is ensured. That is, it is possible to prevent the flying object from taking off in a state where the flying object cannot fly.

Further, upon receiving the proximity notification, the setting base 50 starts the attracting of flying object 30 by electromagnetic holders 55 and the locking of flying object 30 by arms 56. By this operation, the flying object control system can confirm that the flying object is in proximity, and can reliably hold the flying object by locking by the arms and by attraction by the magnetic force of the electromagnetic holders. The flying object can easily stay on the setting base.

Further, flying object 30 receives the takeoff instruction transmitted from terminal 10 carried by inspector hm in response to the operation of inspector hm. By this operation, the inspector can make the flying object take off at any time.

Further, setting base 50 transmits a landing completion notification to terminal 10 carried by inspector hm. By this operation, the inspector can confirm that the flying object has taken off even if the flying object is at a place out of sight.

Further, setting base 50 is attached (disposed) on the ceiling of closed space 100 (an example of a substantially closed space) such as a room. Flying object 30 descends from setting base 50 and takes off. By this operation, the ceiling of the closed space can be effectively used as a landing pad for the flying object. Further, even if the lower surface of the closed space is not available, the flying object can stay.

Further, magnetic bodies 313 are attached on a surface, of flying object 30, to be held by setting base 50. Electromagnetic holders 55 are electromagnetic components that are attached on the surface that holds flying object 30, and magnetic force of electromagnetic holders 55 can be controlled by energization. Electromagnetic holders 55 generate magnetic force to attract magnetic bodies 313, thereby holding flying object 30. With this arrangement, the setting base can easily hold the flying object and release the holding.

The exemplary embodiment has been described above with reference to the accompanying drawings, but the present disclosure is not limited to the above example. It is apparent that those skilled in the art can conceive various modification examples, correction examples, substitution examples, addition examples, removal examples, and equivalent examples within the scope described in the attached claims, and those examples are understood to be within the technical scope of the present disclosure. In addition, the components in the above-mentioned exemplary embodiment may be arbitrarily combined without departing from the spirit of the present invention.

For example, in the above exemplary embodiment, the locking by the arms are released beforehand while the flying object is being attracted by the electromagnetic holders, and the attraction by the electromagnetic holders are then released to cause the flying object to take off. However, the locking by the electromagnetic holders may be released beforehand while the flying object is being locked by the arms, and the locking by the arms may then be released to cause the flying object to take off.

In the above exemplary embodiment, the setting base is attached on the ceiling of the closed space in a fixed manner. However, the setting base may be attached movably along the surface of the ceiling. In this case, a place where the flying object stays does not have to be fixed but can be arbitrarily changed.

In the exemplary embodiment, the setting base is attached on the ceiling of the closed space but may be disposed on a boundary plane of the closed space as a part of the closed space. The setting base relays the communication between the flying object inside the closed space and the terminal outside the closed space. With this arrangement, even if the closed space is shielded from radio waves, communication is secured between the terminal and the flying object.

The present disclosure is useful as a flying object control system and a flying object control method that perform a smooth takeoff operation of a flying object from a predetermined initial position and thus improve convenience of an inspection work using the flying object to grasp conditions of an inspection object.

What is claimed is:

1. A flying object control system comprising:
a flying object; and
a setting base that performs holding of the flying object and releasing the holding, the flying object and the setting base being communicable with each other, wherein
the flying object controls, upon receiving a takeoff instruction, thrust for taking off from a predetermined initial position, and when the thrust becomes greater than or equal to a first threshold, the flying object notifies the setting base of a start notification,
upon receiving the start notification, the setting base releases the holding of the flying object and notifies the flying object of a release completion notification, and
upon receiving the release completion notification, the flying object takes off from the predetermined initial position by controlling the thrust in such a manner that the thrust becomes a second threshold smaller than the first threshold.

2. The flying object control system according to claim 1, wherein the flying object gets close to the predetermined initial position while controlling to increase the thrust to a third threshold greater than the second threshold, and notifies the setting base of a proximity notification, and the setting base holds the flying object upon receiving the proximity notification and notifies the flying object of a landing completion notification.

3. The flying object control system according to claim 1, wherein the setting base includes:

a first holder that electromagnetically holds the flying object; and a second holder that mechanically holds the flying object, the flying object notifies the setting base of a hold release instruction upon receiving the takeoff instruction, and upon receiving the hold release instruction, the setting base maintains the holding of the flying object by the first holder and releases the holding of the flying object by the second holder.

4. The flying object control system according to claim 3, wherein, upon receiving the start notification, the setting base releases the holding of the flying object by turning off electromagnetic force of the first holder.

5. The flying object control system according to claim 2, wherein the setting base includes:

a first holder that electromagnetically holds the flying object; and a second holder that mechanically holds the flying object, wherein, upon receiving the proximity notification, the setting base starts the holding of the flying object by each of the first holder and the second holder.

6. The flying object control system according to claim 1, wherein the takeoff instruction is transmitted from a terminal carried by an inspector in response to an operation of the inspector.

7. The flying object control system according to claim 2, wherein the setting base transmits the landing completion notification to a terminal carried by an inspector.

8. The flying object control system according to claim 1, wherein the setting base is disposed on a ceiling of a substantially closed space, and the flying object descends from the setting base and takes off.

9. The flying object control system according to claim 3, wherein the flying object has a magnetic material on a surface that is held by the setting base, and the first holder is an electromagnetic component that electromagnetically controls generation of magnetic force and that is attached on a surface on which the flying object is held, and the first holder generates the magnetic force to attract the magnetic material and hold the flying object.

10. The flying object control system according to claim 5, wherein the flying object has a magnetic material on a surface that is held by the setting base, and the first holder is an electromagnetic component that electromagnetically controls generation of magnetic force and that is attached on a surface on which the flying object is held, and the first holder generates the magnetic force to attract the magnetic material and hold the flying object.

11. A flying object control method performed by a flying object control system including, in a mutually communicable manner, a flying object, and a setting base that performs holding of the flying object and releasing the holding, the flying object control method comprising:

upon receiving a takeoff instruction, the flying object controlling thrust for taking off from a predetermined initial position;

when the thrust becomes greater than or equal to a first threshold, the flying object notifying the setting base of a start notification;

upon receiving the start notification, the setting base releasing the holding of the flying object and notifying the flying object of a release completion notification; and upon receiving the release completion notification, the flying object taking off from the predetermined initial position by controlling the thrust in such a manner that the thrust becomes a second threshold smaller than the first threshold.

* * * * *